US005625614A

United States Patent [19]

Taniguchi

[11] Patent Number: 5,625,614
[45] Date of Patent: Apr. 29, 1997

[54] OPTICAL DISC DATA RECORDING APPARATUS AND METHOD USING MODIFIED PIT LENGTHS

[75] Inventor: Shoji Taniguchi, Tokorozawa, Japan

[73] Assignee: Pioneer Electronic Corporation, Tokyo-to, Japan

[21] Appl. No.: 400,565

[22] Filed: Mar. 8, 1995

[30] Foreign Application Priority Data

Mar. 11, 1994 [JP] Japan .................................. 6-041586

[51] Int. Cl.$^6$ ...................................................... G11B 7/00
[52] U.S. Cl. .............................. 369/116; 369/54; 369/48
[58] Field of Search ............................ 369/116, 48, 54, 369/59, 58, 47, 32

[56] References Cited

U.S. PATENT DOCUMENTS

| | | | |
|---|---|---|---|
| 4,866,692 | 9/1989 | Saito et al. | 369/48 |
| 4,873,680 | 10/1989 | Chung et al. | 369/116 |
| 4,961,182 | 10/1990 | Saito et al. | 369/124 |
| 5,109,373 | 4/1992 | Ohno et al. | 369/116 |
| 5,111,443 | 5/1992 | Yokogawa | 369/48 |
| 5,297,129 | 3/1994 | Wilkinson et al. | 369/59 |
| 5,327,411 | 7/1994 | Iwasa et al. | 369/59 |
| 5,359,585 | 10/1994 | Tanoue et al. | 369/48 |
| 5,485,449 | 1/1996 | Nakajo | 369/116 |
| 5,490,124 | 2/1996 | Furumiya et al. | 369/116 |
| 5,499,227 | 3/1996 | Higasa | 369/116 |

*Primary Examiner*—Nabil Hindi
*Attorney, Agent, or Firm*—Young & Thompson

[57] ABSTRACT

An information recording apparatus for recording at least a video signal and a digital audio signal onto an optical record medium, is provided with: a pulse signal generation device for generating a pulse signal having a pulse width corresponding to the video signal and the digital audio signal to be recorded; a first pulse width adjustment device coupled to the pulse signal generation device, for decreasing the pulse width of the pulse signal by an amount proportional to the pulse width of the pulse signal to output a firstly adjusted signal having a firstly adjusted pulse width; a second pulse width adjustment device coupled to the first pulse width adjustment device, for increasing the firstly adjusted pulse width of the firstly adjusted signal by a predetermined amount to output a secondly adjusted signal having a secondly adjusted pulse width; and a light emission device for emitting a recording light corresponding to the secondly adjusted signal onto the optical record medium to form a record pit having a pit length corresponding to the secondly adjusted pulse width of the secondly adjusted signal.

14 Claims, 8 Drawing Sheets

OPTICAL DISC DATA RECORDING APPARATUS AND METHOD USING MODIFIED PIT LENGTHS

BACKGROUND OF THE INVENTION

1. Field of the Invention

The present invention generally relates to an information recording method, and more particularly to an apparatus for and a method of recording in formation onto a write-once-read-many type optical disc.

2. Description of the Related Art

There is an LD (Laser vision Disc) used as an optical disc upon which a video signal and an audio signal can be recorded. The LD is known as an optical record medium of ROM (Read Only Memory) type, capable of storing a high resolution, long duration video sequence.

There is one type of LD, on which an analog video signal and a frequency-modulated audio signal are recorded. There is another type of LD i.e. LDD (Laser vision Disc with Digital audio signal), on which an EFM-modulated (Eight to Fourteen Modulation-modulated) digital audio signal is recorded in addition to the analog video signal and audio signal.

According to the LDD, not only a high resolution image, but also a high quality audio signal can be reproduced.

As read only memory (ROM) devices, the LDs do not allow on end user to record data thereon.

In order to solve this problem, there is an LD of write-once-read-many type (WORM type). However, this WORM LD suffers from a significantly degraded S/N (Signal to Noise ratio) and BER (Block Error Rate), rendering these devices impractical for use with an EFM-modulated digital audio signal. Here, the BER represents the percentage [%] of block error obtained by dividing the number of block errors of a block constituting the EFM digital audio signal by the total number of blocks within a predetermined time interval.

SUMMARY OF THE INVENTION

It is therefore an object of the present invention to provide an information recording apparatus and method, which can improve the S/N and the BER with respect to an optical record medium such as a write-once-read-many type optical disc.

The above object of the present invention can be achieved by a first information recording apparatus for recording a least a video signal and digital audio signal onto an optical record medium. the first information recording apparatus is provided with: a pulse signal generation device for generating a pulse signal having a pulse width corresponding to the video signal and the digital audio signal to be recorded; a first pulse width adjustment device coupled to the pulse signal generation device, for proportionally decreasing the width of the pulse to output a firstly adjusted signal having a firstly adjusted pulse width; a second pulse width adjustment device coupled to the first pulse width adjustment device, for increasing the firstly adjusted pulse width of the firstly adjusted signal by a predetermined amount to output a secondly adjusted signal having a secondly adjusted pulse width; and a light emission device for emitting a recording light corresponding to the secondly adjusted signal onto the optical record medium to form a record pit having a pit length corresponding to the secondly adjusted pulse width of the secondly adjusted signal.

According to the first apparatus of the present invention, the first pulse width adjustment device proportionally decreases the pulse width of the signal. Further, the second pulse width adjustment device increases the firstly adjusted pulse width of the firstly adjusted signal by a predetermined amount. Thus, the recording duty is firstly adjusted by the first pulse width adjustment device based on the recording duty of a record pit, which has a relatively long pit length, as the standard of the adjustment. After that, the recording duty is further adjusted by the second pulse width adjustment device so that the increased amount for the recording duty of a relatively short record pit is apparently larger than the increased amount for the recording duty of a relatively long record pit. Consequently, with respect to all record pits having short to long pit lengths, optimum recording duties can be obtained, and the optimum pit formations for all record pits can be realized.

In one embodiment of the present invention, the first pulse width adjustment device may be a symmetry adjustment circuit.

In another aspect of an embodiment of the present invention, the second pulse width adjustment device may be a $\Delta t$ adjustment circuit. In this case, the $\Delta t$ adjustment circuit may include: an ECL (Emitter Coupled Logic) output comparator for performing an emitter-coupled-logic comparison of the firstly adjusted signal; and an ECL buffer for buffering the firstly adjusted signal after the emitter coupled logic comparison to output the secondly adjusted signal.

In another aspect of an embodiment of the present invention, the pulse signal generation device may have a mix circuit for mixing the video signal and the digital audio signal to generate the pulse signal.

In another aspect of an embodiment of the present invention, the pulse signal generation device may have: a pre-emphasis circuit for pre-emphasizing the video signal; an FM modulation circuit for frequency-modulating the pre-emphasized video signal; a band pass filter for band-passing the frequency-modulated signal; and a mix circuit for mixing the band-passed signal and the digital audio signal to generate the pulse signal.

In another aspect of an embodiment of the present invention, the reflection coefficient of the optical record medium where the record pit exists is lower than that where the record pit does not exist. The apparatus is further provided with a device interposed between the second pulse width adjustment device and the light emission device the secondly adjusted signal to output an inverted signal to light emission device. The light emission device emits the recording light corresponding to the inverted signal.

The above object of the present invention can be also achieved by a second embodiment for recording an input signal onto an optical record medium, the reflection coefficient being lower at a record pit than where a record pit does not exist. The second information recording apparatus is provided with: a device for inverting a phase of the input signal; and a light emission device for emitting a recording light corresponding to the inverted signal onto the optical record medium to form a record pit having a pit length corresponding to a pulse width of the inverted signal.

According to the second embodiment of the present invention, when the optical record medium such as an optical disc is produced, the record pits having various pit lengths can be easily separated and distinguished from one another, so that the accurate reproduction can be performed.

In one aspect of the second embodiment of the present invention, the inverting device may have a switch for selectively inverting and non-inverting the phase of the input signal.

The above object of the present invention can be also achieved by a first information recording method of recording at least a video signal and a digital audio signal onto an optical record medium. The first information recording method includes the steps of: generating a pulse signal having a pulse width corresponding to the video signal and the digital audio signal to be recorded; proportionally decreasing the pulse width of the signal to output a firstly adjusted signal having a firstly adjusted pulse width; increasing the firstly adjusted pulse width of the firstly adjusted signal by a predetermined amount to output a secondly adjusted signal having a secondly adjusted pulse width; and emitting a recording light corresponding to the secondly adjusted signal onto the optical record medium to form a record pit having a pit length corresponding to the secondly adjusted pulse width of the secondly adjusted signal.

According to one embodiment of the present invention, firstly, the pulse width of the signal is proportionally decreased. Further, the width of each pulse of the firstly adjusted signal is increased by a predetermined amount. Thus, the recording duty is firstly adjusted by use of the recording duty of a record pit, which has a relatively long pit length, as the standard of the adjustment. After that, the recording duty is further adjusted so that the increased amount for the recording duty of a relatively short record pit is apparently larger than the increased amount for the recording duty of a relatively long record pit. Consequently, with respect to all record pits having short to long pit lengths, optimum recording duties can be obtained, and the optimum pit formations for all record pits can be realized.

In one aspect of the first embodiment of the present invention, the pulse width decreasing step may include the step of performing a symmetry adjustment of the pulse signal.

In another aspect of the first embodiment of the present invention, the pulse width increasing step may include the step of performing a Δt adjustment of the firstly adjusted signal. In this case, the Δt adjustment performing step may include the steps of: performing an emitter-coupled-logic comparison of the firstly adjusted signal; and buffering the firstly adjusted signal after the emitter coupled logic comparison to output the secondly adjusted signal.

In another aspect of the first embodiment of the present invention, the pulse signal generating step includes the step of mixing the video signal and the digital audio signal to create the pulse signal.

In another aspect of the first embodiment of the present invention, the pulse signal generating step may include the steps of: pre-emphasizing the video signal; frequency-modulating the pre-emphasized video signal; band-passing the frequency-modulated signal; and mixing the band-passed signal and the digital audio signal to be the pulse signal.

In another aspect of the first embodiment of the present invention, the reflection coefficient of the optical record medium where a record pit exists is lower than that where a record pit does not exist. The first embodiment further includes the step of inverting the secondly adjusted signal. The recording light corresponding to the inverted signal is emitted in the light emitting step.

The above object of the present invention can be also achieved by a second information recording method of recording an input signal onto an optical record medium, a reflection coefficient of which where a record pit exists being lower than that where the record pit does not exist. The second method includes the steps of: inverting a phase of the input signal to output an inverted signal; and emitting a recording light corresponding to the inverted signal onto the optical record medium to form a record pit having a pit length corresponding to a pulse width of the inverted signal.

According to the second embodiment of the present invention, when the optical record medium such as an optical disc, which is recorded by the second method of the present invention, is reproduced, the record pits having various pit lengths can be easily separated and distinguished form each other, so that the accurate reproduction can be performed.

In another aspect of the second embodiment of the present invention, the inverting step may include the step of selectively inverting and non-inverting the phase of the input signal.

The nature, utility, and further features of this invention will be more clearly apparent from following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained.

First Embodiment

Figure 1:
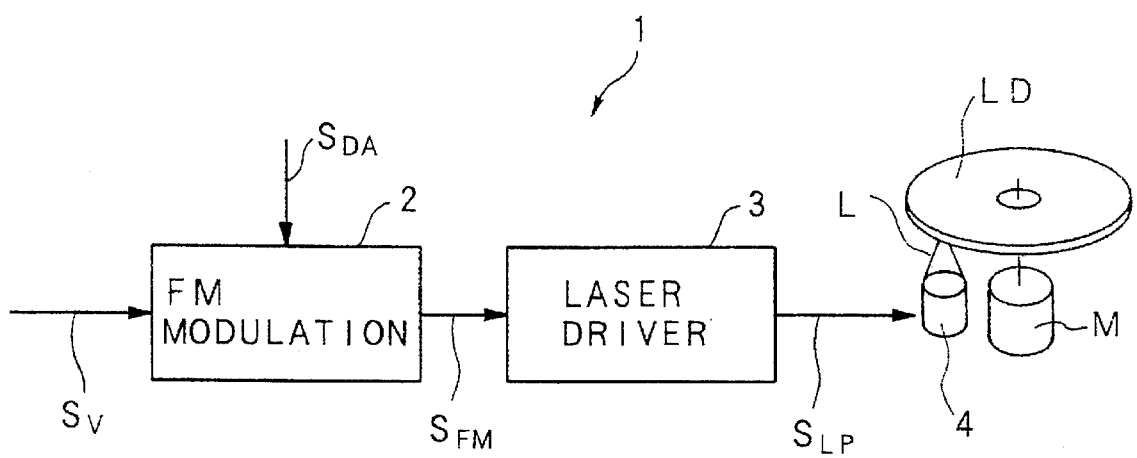
FIG. 1 is a block diagram of an information recording apparatus as a first embodiment of the present invention.

FIG. 1 shows a major portion of an information recording apparatus as a first embodiment of the present invention for recording at least a video signal and an EFM digital audio signal. The information recording apparatus of the first embodiment may record an FM audio signal in addition to the video signal and EFM digital signal.

In FIG. 1, an information recording apparatus 1 is provided with: an FM modulation unit 2, to which a video signal $S_v$, and an EFM digital audio signal $S_{DA}$ are inputted, for outputting a mixed FM modulated signal $S_{FM}$; a laser driver unit 3 for generating and outputting a recording laser pulse control signal $S_{LP}$ on the basis of the mixed FM modulated signal $S_{FM}$; and an optical pickup 4 for performing light-modulation on the basis of the recording laser pulse light L onto an optical disc (i.e. Laser vision Disc) LD, which is rotated by a spindle motor M.

Figure 2:
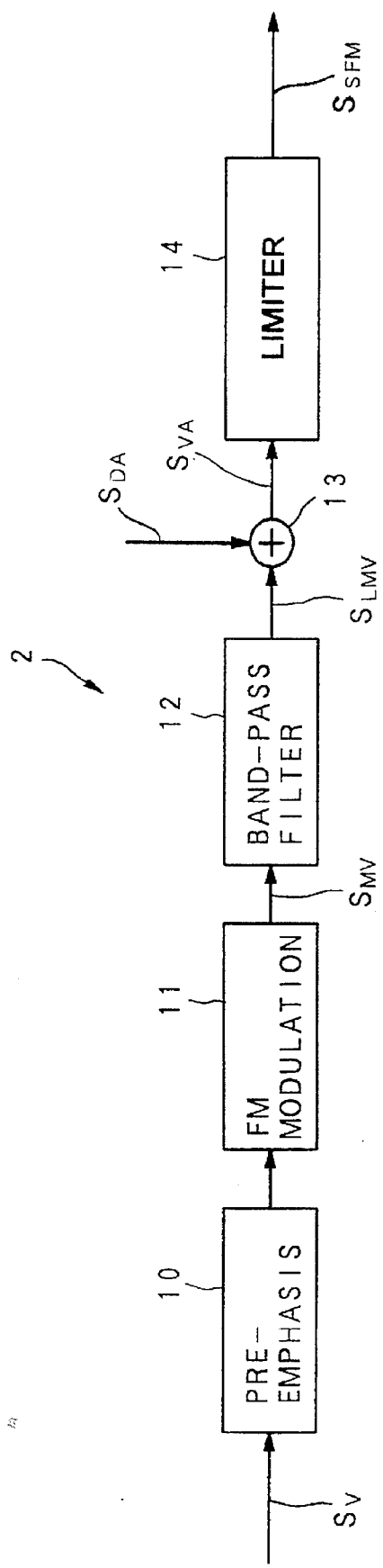
FIG. 2 is a block diagram of an FM modulation unit of the information recording apparatus of FIG. 1.

FIG. 2 shows a construction of the FM modulation unit 2.

In FIG. 2, the FM modulation unit 2 is provided with: a pre-emphasis circuit 10 for applying a pre-emphasis to the video signal $S_V$ and outputting it; an FM modulation circuit 11 for FM-modulating the video signal $S_V$, to which the pre-emphasis has been applied, and outputting it as an FM-modulated video signal $S_{MV}$; a band pass filter 12 for passing only a video band component of the FM-modulated video signal $S_{MV}$ and outputting it as an FM-modulated video band range signal $S_{LMV}$; a mixing circuit 13 for mixing the EFM digital audio signal $S_{DA}$ with the FM-modulated video band range signal $S_{LMV}$ to output a video and audio mixed signal $S_{VA}$; and a limiter 14 for limiting an amplitude of the video and audio mixed signal $S_{VA}$ to change its form into a square waveform and outputting it as a mixed FM modulated signal $S_{SFM}$ and also performing a symmetry adjustment by changing a limiter balance thereof.

Here, the symmetry adjustment is explained.

In order to improve the S/N and the BER at the time of reproduction, it is required to form a high quality, jitter-free record pit in the recording operation of the optical disc such as an LD, and to make the reproduced RF signal resemble the original signal as much as possible.

To achieve this requirement, the recording duty is decreased and the recording laser power is commensurately increased. According to this method, it becomes possible to prevent to some extent the record pit from having a tear-drop shape due to heat accumulation.

One embodiment uses a symmetry adjustment method to adjust the recording duties of all record pits ascending to an optimum reduction rate for the record pit which has a relatively long pit length. For example, assuming that the optimum reduction rate of the recording duty of the record pit having the relatively long pit length is X%, the recording duties of all pit lengths are reduced at the reduction rate of X%.

By this symmetry adjustment, as compared with the case where the symmetry adjustment is not applied, a more ideal shape of the record pit can be realized.

Figure 3:
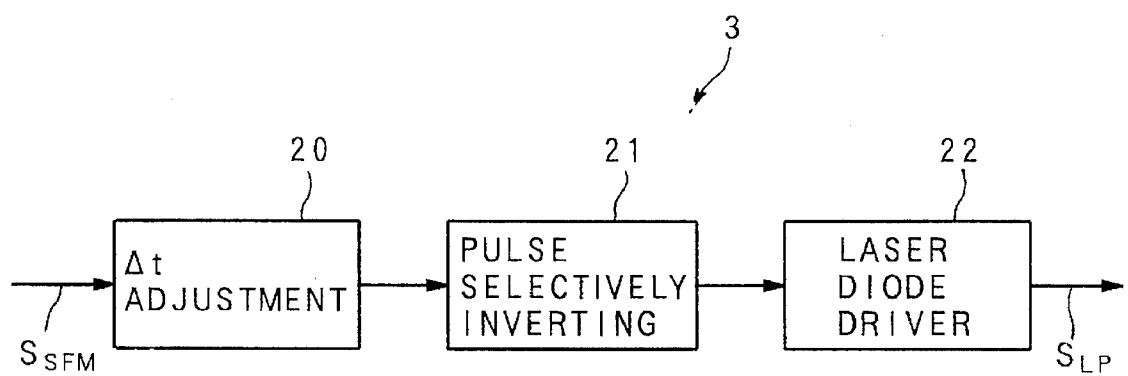
FIG. 3 is a block diagram of laser driver unit of the information recording apparatus of FIG. 1.

FIG. 3 shows a laser driver unit 3 of FIG. 1.

In FIG. 3, the laser driver unit 3 is provided with: a Δt adjustment circuit 20 for re-adjusting the recording duty corresponding to the mixed FM modulated signal $S_{SFM}$ outputted from the limiter 15 in accordance with the record pit which has a relatively short length (i.e. performing a Δt adjustment); a pulse selectively inverting circuit 21 for selectively inverting and non-inverting the phase of the output signal of the Δt adjustment circuit 20; and a laser diode driver 22 for driving a laser diode on the basis of the output signal of the pulse selectively inverting circuit 21 i.e. generating the recording laser pulse control signal $S_{LP}$.

Here, the Δt adjustment is explained.

By symmetry adjustment, since the recording duty is adjusted by use of a the recording duty of a pit having a relatively long pit length as the standard of the adjustment, the recording laser pulse width becomes too small with respect to a record pit having a relatively short pit length, preventing accurate pit formation.

More concretely, the highest recording frequency in the LD format is as high as 9.3 MHz, and the optimum pit length (which corresponds to the minimum pit length) becomes 0.61 μm (on condition that the linear velocity is 11.4 m/s). Thus, accurate pit formation cannot be performed if the recording duty is reduced too much in the symmetry adjustment.

Therefore, it is desirable to increase the pulse widths of all recording laser pulses corresponding to the recording duties after the symmetry adjustment by predetermined amount i.e. by several ns (nanoseconds) respectively. Namely, with respect to each of the record pits, the recording duty is increased by a predetermined amount.

As such, the recording duty of a relatively short record pit is apparently increased more as compared with the recording duty of a relatively long record pit, so that the optimum pit formation can be performed with respect to a relatively short record pit.

Figure 4:
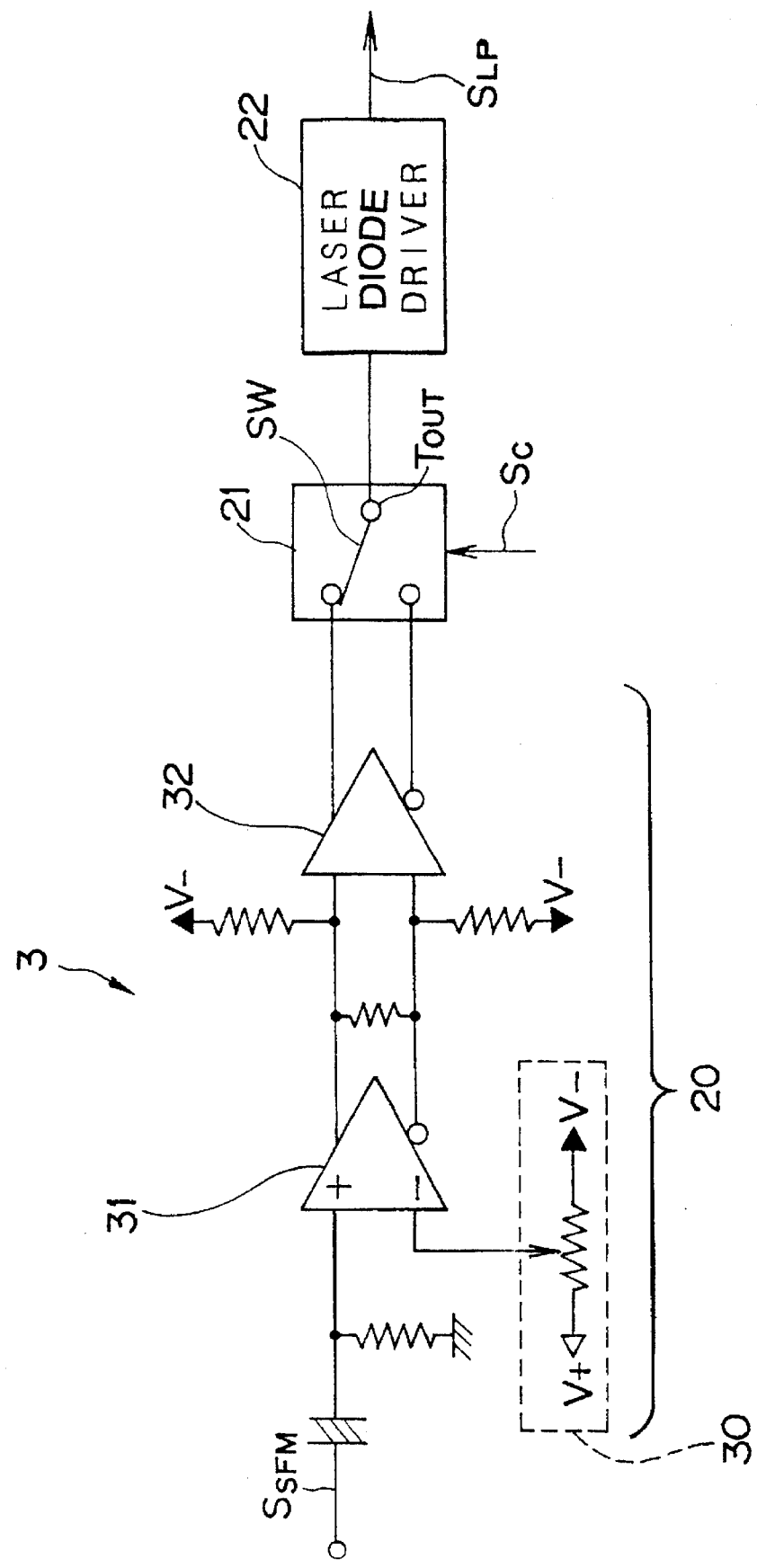
FIG. 4 is a block diagram of the laser driver unit of FIG. 3 in a more concrete form.

FIG. 4 shows a construction of the Δt adjustment circuit 20 and a pulse selectively inverting circuit 21 in more concrete forms.

In FIG. 4, the Δt adjustment circuit 20 is provided with: an ECL (Emitter Coupled Logic) output comparator 31 and an ECL buffer 32. The mixed FM modulated signal $S_{SFM}$ is inputted to one input terminal of the ECL output comparator 31 from the limiter 15. Another input terminal of the ECL output comparator 31 is connected to a variable standard voltage source 30 for setting cutoff voltage level to determine the Δt adjustment amount i.e., determine how much the recording laser pulse width is increased. The ECL output comparator 31 compares to the level of the mixed FM modulate signal $S_{SFM}$ with the level of the cutoff voltage level, and outputs a signal having the ECL level. One input terminal of the ECL buffer 32 is connected to the non-inverted output terminal of the ECL output comparator 31. Another input terminal of the ECL buffer 32 is connected to the inverted terminal of the ECL output comparator 31. The ECL buffer 32 performs the buffering operation of those inputted signals.

The selectively inverting circuit 21 has a switch SW, whose output terminal Tout is connected to the laser diode driver 22 of the ECL driving type, and which selectively connects the output terminal Tout with one of the output terminals of the ECL buffer 32, according to a switching control signal Sc from a controller of the information recording apparatus not shown in the figure. The laser diode driver 22 generates the recording laser pulse control signal $S_{LP}$.

Next, the recording operation of the present embodiment will be explained with reference to FIGS. 2 to 6.

In FIG. 2, the pre-emphasis circuit 10 applies the pre-emphasis to the video signal Sv and outputs it to the FM modulation circuit 11. By this, the FM modulation circuit 11 FM-modulates the pre-emphasized video signal Sv to output the modulated video signal $S_{MV}$ to the band pass filter 12. The band pass filter 12 passes only the video band component of the modulated video signal $S_{MV}$ and outputs it as $S_{LMV}$ to the mixing circuit 13.

Figure 5:
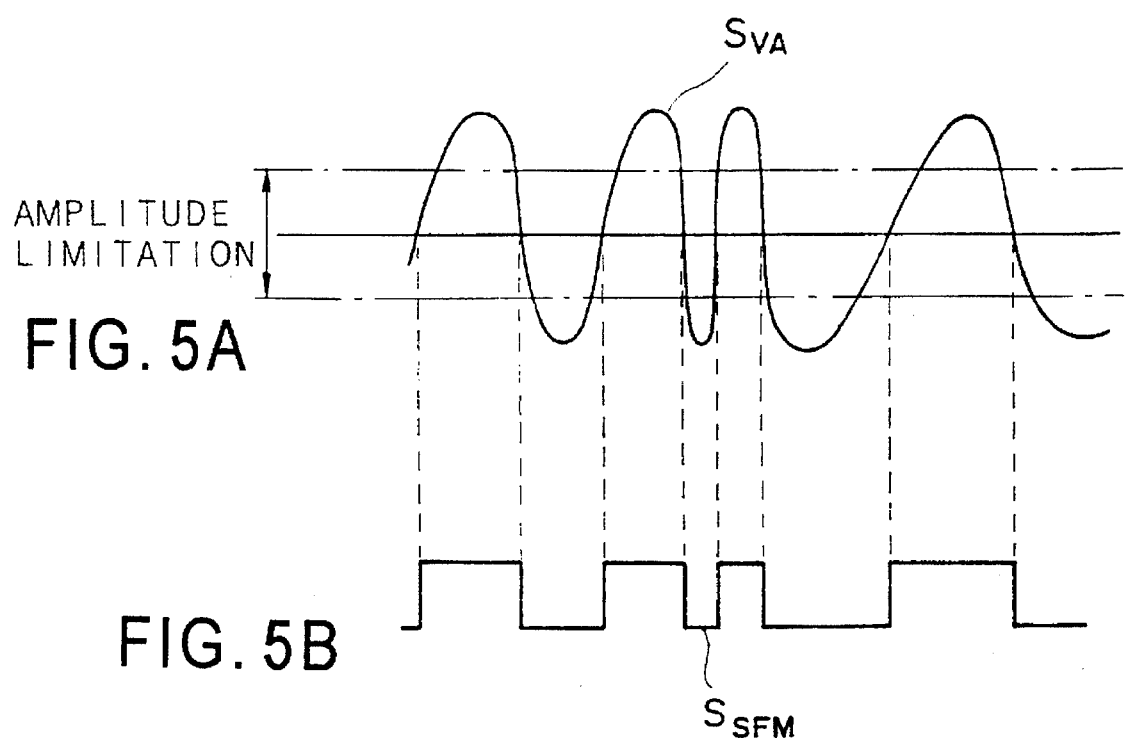
FIGS. 5A and 5B are timing charts for explaining an operation of the information recording apparatus of FIG. 1.

As a result, the mixing circuit 13 mixes the modulated video band signal $S_{LMV}$ and the EFM digital audio signal $S_{DA}$ to produce the video audio mixed signal $S_{VA}$ (as shown in FIG. 5), and outputs it to the limiter 14.

The limiter 14 performs amplitude control while changing the limiter balance. Namely, the limiter 14 performs a symmetry adjustment of the video audio mixed signal $S_{VA}$ by performing the amplitude control while shifting the level of the amplitude control band range. Then the limiter 14 changes the form of the video audio mixed signal $S_{VA}$, which has been symmetry-adjusted, to a square wave, and outputs it as the mixed FM modulates signal $S_{SFM}$ (as shown in FIG. 5) to the Δt adjustment circuit 20 of FIG. 4.

In FIG. 4, the ECL comparator 31 of the Δt adjustment circuit 20 compares the voltage level of the inputted mixed FM modulated signal $S_{SFM}$ with the cutoff voltage level set by the variable standard voltage source 30. Then, if the voltage level of the inputted mixed FM modulated signal $S_{SFM}$ is higher than the cutoff level voltage, the output voltage of the non-inverted output terminal becomes the "H" level, and the output voltage of the inverted output terminal becomes the "L" level.

This output voltage waveform of the ECL comparator 31 is changed in its waveform by the ECL buffer 32, is inverted in its phase by the pulse selectively inverting circuit 21 as occasion demands, is applied to the laser diode driver 22, and is outputted as the recording pulse control signal $S_{LP}$ from the laser diode driver 22.

By this operation, the recording laser pulse light L is irradiated from the laser diode of the optical pickup 4, so that a record pit is formed on the optical disc LD in FIG. 1.

Figure 6:
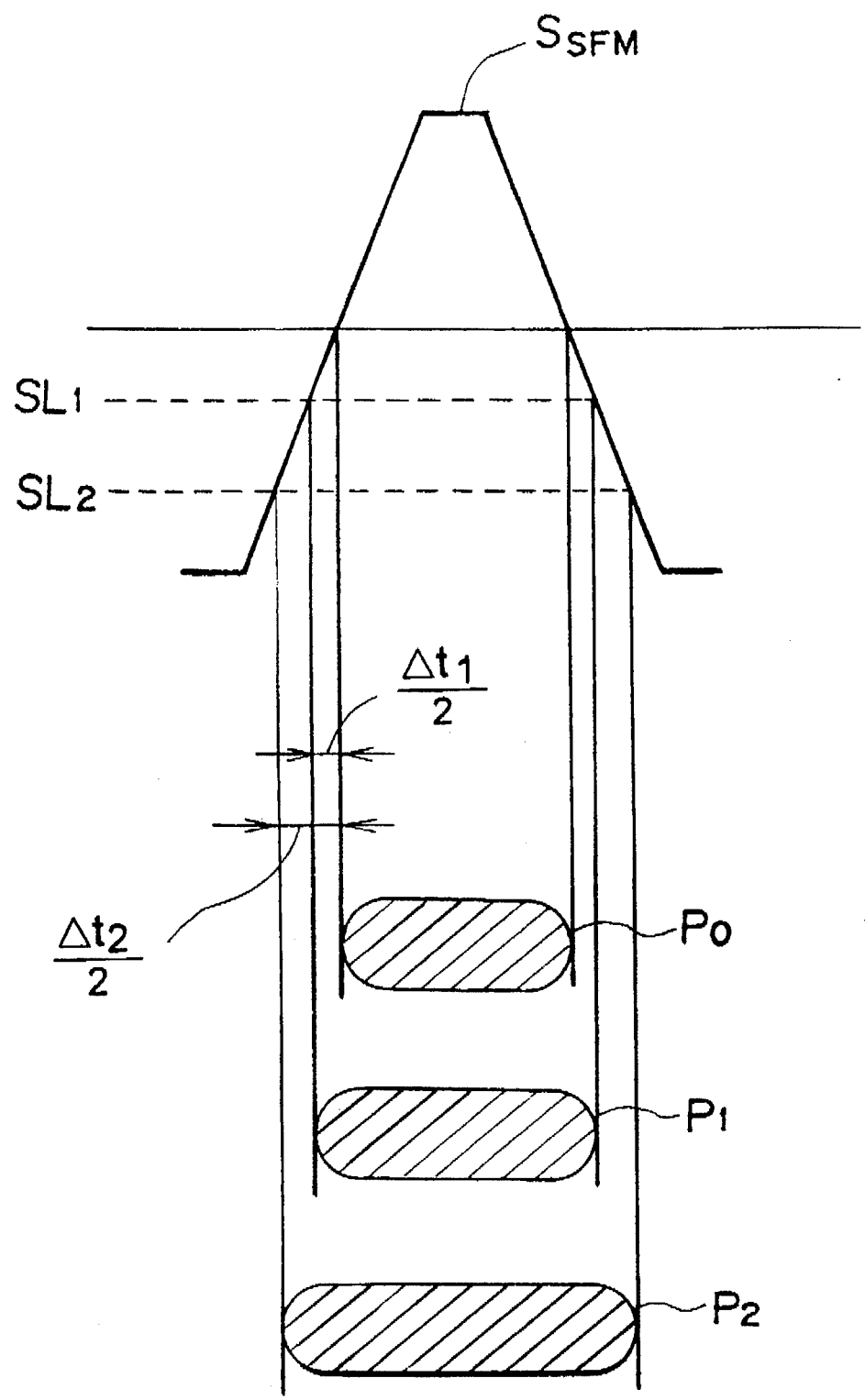
FIG. 6 is a diagram for explaining a Δt correction in the operation of the information recording apparatus of FIG. 1.

FIG. 6 shows the relationship between the standard cutoff level of the variable standard electric source and the record pit, which is actually formed on the optical disc.

In FIG. 6, the ideal form of the record pit corresponding to the waveform of the mixed FM modulated signal $S_{SFM}$ is a record pit P0.

On the other hand, if the cutoff voltage level of the variable standard electric source 30 is set to first level SL1 by the Δt adjustment there is formed a record pit P1 with a pit length that is longer than the ideal record pit P0 by Δt1/2 on either end. If the cutoff voltage level of the variable standard electric source 30 is set to a second cutoff voltage level SL2 by the Δt adjustment, there is formed a record pit P2 with a length that is longer than the ideal record pit P0 by Δt2/2 (>Δt1/2) on either end.

As such, the cutoff voltage level can be freely set at the variable standard electric source 30 by the factors such as the material of the optical disc to be recorded and the power of the recording laser light.

By performing the recording operation as described above, the generation of the pit having the tear-drop shape can be prevented by reducing the recording duty if the recording frequency is relatively low (i.e., if the pit length is relatively long). The record pit can be generated with a lesser reduction of the recording duty if the recording frequency is relatively high (i.e., if the pit length is relatively short).

As a result, it becomes possible to form record pits with low jitter, and it also becomes possible to easily detect the conversion of the pit length. In case of recording the video signal, the FM audio signal and the EFM digital audio signal onto the optical disc LD of write-once-read-many type, the S/N and the BER can be improved, so that the reproduced signal waveform can closely resemble that of the original record signal.

Second Embodiment

The second embodiment of the present invention is for use with an optical disc with a reflection coefficient of the record pit portion (i.e. a portion where a record pit exists) that is lower than the reflection coefficient of the non-recorded portion (i.e. a portion where a record pit does not exist).

Figure 7A:
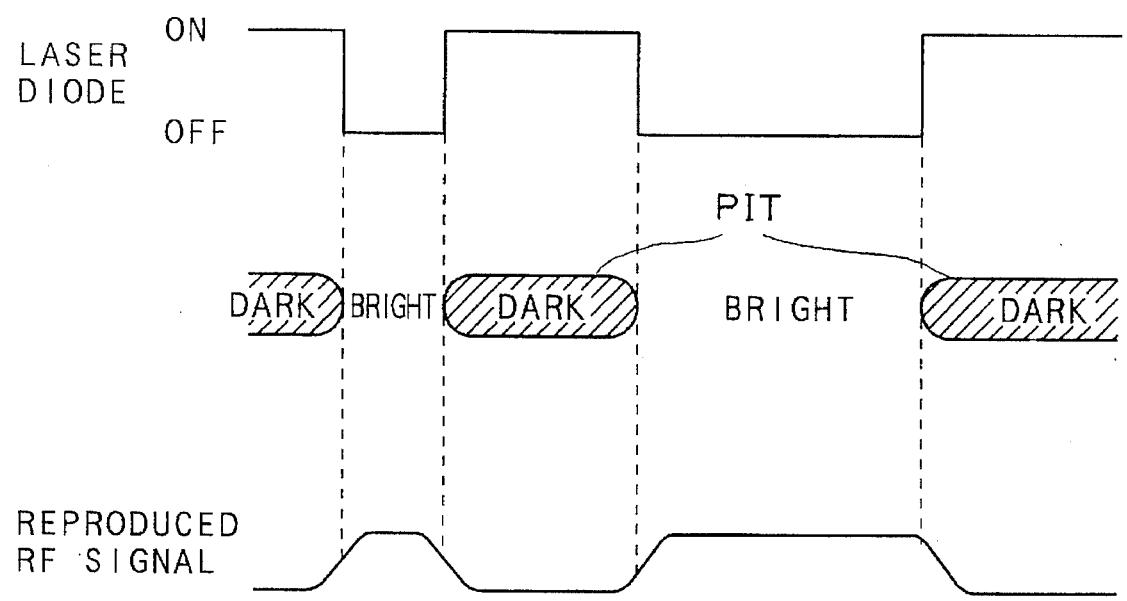
FIG. 7, which consist of FIGS. 7A and FIG. 7B, are diagrams for explaining an operation of a second embodiment of the present invention.
Figure 7B:
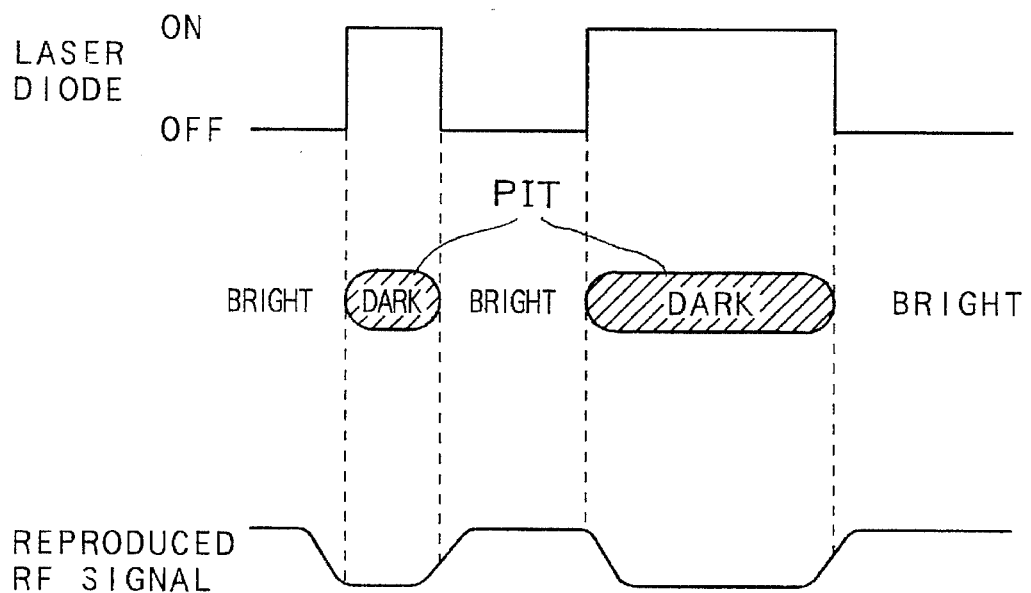

FIG. 7 shows the characteristic of the optical disc of the second embodiment. Specifically, FIG. 7A shows the case where the phase of the recording laser pulse control signal is inverted, while FIG. 7B shows the case where the phase of the recording laser pulse signal is not inverted.

FIG. 7B, the optical disc used in the second embodiment has such a characteristic that the portion to which the laser diode is turned on i.e., the portion where the record pit has been formed has a lower reflection coefficient than the non-recorded portion, and the record pit portion is relatively dark.

As a result, the RF signal is reproduced as shown in FIG. 7B.

Figure 8A:
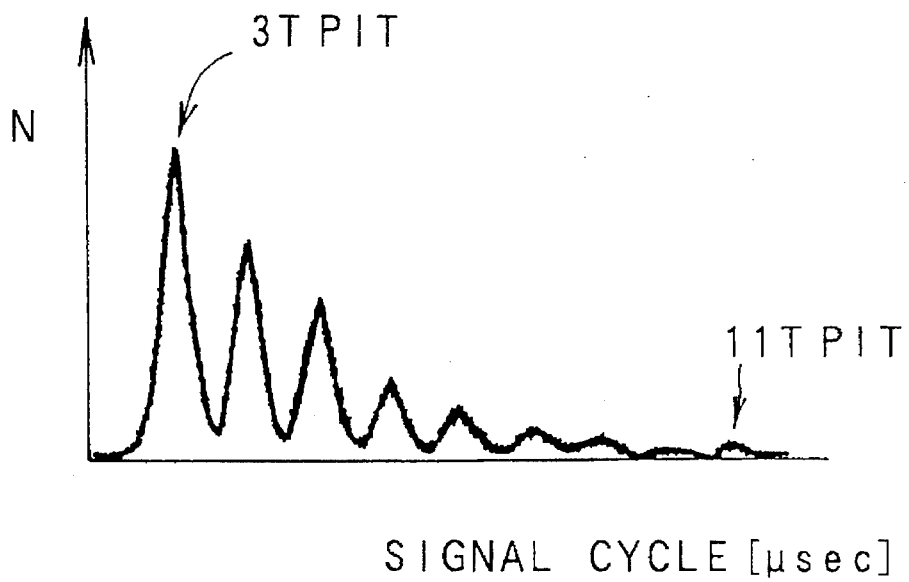
FIG. 8, which consist of FIGS. 8A and FIG. 8B, are graphs for explaining an effect of the second embodiment.
Figure 8B:
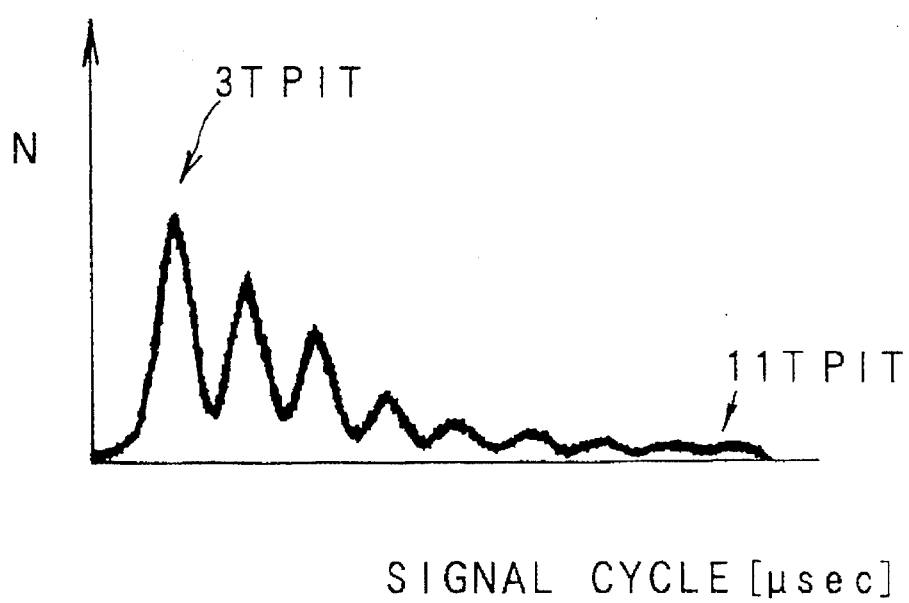

The TIA (Time Interval Analysis)of the EFM signal distribution N obtained by extracting the EFM band range from this RF signal, is shown in FIG. 8B. Each peak in FIG. 8B corresponds to each pit having different pit length (i.e. 3T to 11T pit).

As shown in FIG. 8B, it is difficult to clearly distinguish each pit to perform the EFM-reproduction (i.e. without inverting the recording laser pulse control signal at the time of recording), resulting in a BER that is degraded at the time of reproduction.

Therefore, in the second embodiment, in case of reproducing such an optical disc, the phase of the recording laser pulse control signal $S_{LP}$ is inverted by use of the selectively inverting circuit 21 shown in FIGS. 3 and 4, so that the ON/OFF of the laser diode is inverted as a result.

This feature of the second embodiment is explained in more detail with reference to FIG. 7A.

In the second embodiment, the ON/OFF control of the laser diode is inverted as shown in FIG. 7A with respect to the case of FIG. 7B. By this, the record pit and the reproduced RF signal become as shown in FIG. 7A.

As for this condition of FIG. 7A, the TIA (Time Interval Analysis) of the EFM signal distribution N obtained by extracting the EFM band range from this RF signal is shown in FIG. 8A. Each peak in FIG. 8A corresponds to each pit having different pit length (i.e. 3T to 11T pit).

As shown in FIG. 8A, it becomes easy to clearly distinguish each pit with respect to the case of FIG. 8B, to perform the more accurate EFM-reproduction, resulting in an improved BER.

As described above in detail, according to the present embodiments, after performing the adjustment of the recording duty by use of the recording by use of the recording duty of the pit having a relatively long pit length as a standard, the recording duty of the relatively short record pit is apparently increased as compared with the recording duty of the relatively long record pit. Thus, the optimum recording duties can be obtained with respect to all of the record pits, which have various pit lengths from a short pit length to a long pit length, and the optimum pit formation can be performed with respect to all of the record pits. Accordingly, the record pit can be formed without jitter, and the reproduced RF signal can resemble the original signal, so that the S/N and the BER can be improved.

Further, according to the present embodiments, in case of reproducing the optical disc, the EFM signal can be easily extracted and distinguished, so that the accurate reproduction can be performed and the S/N and the BER can be improved at the time of reproduction.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information recording apparatus for recording at least a variable video signal and a digital audio signal onto an optical record medium, comprising:

a pulse signal generation means for generating a pulse signal having pulse widths corresponding to the video signal and the digital audio signal to be recorded;

a first pulse signal adjustment means coupled to said pulse signal generation means, for decreasing the width of each pulse of said pulse signal by an amount proportional to the width of each said pulse, to output a firstly adjusted signal having firstly adjusted pulse widths;

a second pulse signal adjustment means coupled to said first pulse signal adjustment means, for increasing the firstly adjusted pulse widths of the firstly adjusted signal by a predetermined amount to output a secondly adjusted signal having secondly adjusted pulse widths; and a light emission means for emitting a recording light corresponding to the secondly adjusted signal onto said optical record medium to form record pits having pit lengths corresponding to the secondly adjusted pulse widths of the secondly adjusted signal.

2. An apparatus according to claim 1, wherein said first pulse width adjustment means comprises a symmetry adjustment circuit for performing a symmetry adjustment of the pulse signal.

3. An apparatus according to claim 1, wherein said second pulse width adjustment means comprises a $\Delta t$ adjustment circuit for performing a $\Delta t$ adjustment of the firstly adjusted signal, which is an adjustment of adding a predetermined time period with respect to a duty cycle of the first adjusted signal.

4. An apparatus according to claim 3, wherein said $\Delta t$ adjustment circuit comprises:

an ECL output comparator for performing an emitter-coupled-logic comparison of the firstly adjusted signal; and an ECL buffer for buffering the firstly adjusted signal after the emitter coupled logic comparison to output the secondly adjusted signal.

5. An apparatus according to claim 1, wherein said pulse signal generation means comprises a mix circuit for mixing the video signal and the digital audio signal to be the pulse signal.

6. An apparatus according to claim 1, wherein said pulse signal generation means comprises:

a pre-emphasis circuit for pre-emphasizing the video signal;

an FM modulation circuit for frequency-modulating the pre-emphasized video signal;

a band pass filter for band-passing the frequency-modulated signal; and a mix circuit for mixing the band-passed signal and the digital audio signal to be the pulse signal.

7. An apparatus according to claim 1, wherein:

a reflection coefficient of said optical record medium at a portion where the record pit exists is lower than that at a portion where the record pit does not exists;

said apparatus further comprises an inverting means interposed between said second pulse width adjustment means and said light emission means, for inverting a phase of the secondly adjusted signal to output an inverted signal to said light emission means; and said light emission means emits the recording light corresponding to the inverted signal.

8. An information recording method of recording at least a variable video signal and a digital audio signal onto an optical record medium, comprising the steps of:

generating a pulse signal having pulse widths corresponding to the video signal and the digital audio signal to be recorded;

decreasing the width of each pulse of the pulse signal by an amount proportional to the width of each said pulse, to output a firstly adjusted signal having firstly adjusted pulse widths;

increasing the firstly adjusted width of each said pulse firstly adjusted signal by a predetermined amount to output a secondly adjusted signal having secondly adjusted pulse widths; and emitting a recording light corresponding to the secondly adjusted signal onto said optical record medium to form record pits having pit lengths corresponding to the secondly adjusted pulse widths of the secondly adjusted signal.

9. A method according to claim 8, wherein said pulse width decreasing step comprises the step of performing a symmetry adjustment of the pulse signal.

10. A method according to claim 8, wherein said pulse width increasing step comprises the step of performing a $\Delta t$ adjustment of the firstly adjusted signal, which is an adjustment of adding a predetermined time period with respect to a duty cycle of the first adjusted signal.

11. A method according to claim 10, wherein said $\Delta t$ adjustment performing step comprises the steps of:

performing an emitter-coupled-logic comparison of the firstly adjusted signal; and buffering the firstly adjusted signal after the emitter coupled logic comparison to output the secondly adjusted signal.

12. A method according to claim 8, wherein said pulse signal generating step comprises the step of mixing the video signal and the digital audio signal to be the pulse signal.

13. A method according to claim 8, wherein said pulse signal generating step comprises the steps of:

pre-emphasizing the video signal;

frequency-modulating the pre-emphasized video signal;

band-passing the frequency-modulated signal; and mixing the band-passed signal and the digital audio signal to be the pulse signal.

14. A method according to claim 8, wherein:

a reflection coefficient of said optical record medium at a portion where the record pit exists is lower than that at a portion where the record pit does not exists;

said method further comprises the step of inverting a phase of the secondly adjusted signal to output an inverted signal; and the recording light corresponding to the inverted signal is emitted in the light emitting step.

* * * * *